US010661214B2

(12) United States Patent
Kim et al.

(10) Patent No.: US 10,661,214 B2
(45) Date of Patent: May 26, 2020

(54) LAUNDRY TREATING APPARATUS (71) Applicant: LG ELECTRONICS INC., Seoul (KR)

(72) Inventors: Hyojun Kim, Seoul (KR); Sokgie Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 15/750,468

(22) PCT Filed: Aug. 3, 2016

(86) PCT No.: PCT/KR2016/008576
§ 371 (c)(1),
(2) Date: Feb. 5, 2018

(87) PCT Pub. No.: WO2017/023122
PCT Pub. Date: Feb. 9, 2017

(65) Prior Publication Data
US 2018/0236390 A1   Aug. 23, 2018

(30) Foreign Application Priority Data
Aug. 3, 2016   (KR) .................. 10-2015-0110194

(51) Int. Cl.
*D06F 58/22* (2006.01)
*B01D 46/00* (2006.01)
(Continued)

(52) U.S. Cl.
CPC ..... *B01D 46/0065* (2013.01); *B01D 46/0042* (2013.01); *D06F 25/00* (2013.01); *D06F 58/02* (2013.01); *D06F 58/22* (2013.01)

(58) Field of Classification Search
CPC ............ B01D 46/0057; B01D 46/0065; B01D 46/0042; B01D 46/0005; B01D 46/0004;
(Continued)

(56) References Cited

U.S. PATENT DOCUMENTS 6,394,113 B1 * 5/2002 Hatanaka ............... B01D 41/04
134/137
9,279,211 B2 * 3/2016 Kim ....................... D06F 58/26
(Continued)

FOREIGN PATENT DOCUMENTS

CN   202265727   6/2012
EP   1 669 487   6/2006
(Continued)

OTHER PUBLICATIONS

European Search Report dated Dec. 19, 2018 issued in Application No. 16833358.1.
(Continued)

*Primary Examiner* — John P McCormack
(74) *Attorney, Agent, or Firm* — Ked & Associates, LLP (57) ABSTRACT

The present invention relates to a laundry treating apparatus having a washable filter provided on an air circulation conduit for drying laundry. Disclosed is the laundry treating apparatus that is capable of automatically or manually washing the filter. The laundry treating apparatus, according to the present invention, comprises: a cabinet (1); an outer tub (2) disposed within the cabinet (1); an inner tub (3) rotatably disposed within the outer tub (2); a circulation conduit (10) that serves as a guide to allow at least a part of air within the outer tub (2) to be discharged from the outer tub (2) and supplied back to the outer tub (2); a fan (17) disposed on the circulation conduit (10) to move air; a filter net (22) disposed on the circulation conduit (10) to filter foreign substances included in the moving air; a filter frame
(Continued)

(24) that supports the filter net (22); and a nozzle (32) that sprays water to remove the foreign substances filtered by the filter net (22). At least a part of the filter frame (24) includes an extraction frame (24a) that is able to be extracted from the cabinet (1).

17 Claims, 6 Drawing Sheets

(51) Int. Cl.
*D06F 25/00* (2006.01)
*D06F 58/02* (2006.01)

(58) Field of Classification Search
CPC ............ B01D 46/0002; B01D 46/0001; B01D 46/0016; B01D 47/06; B01D 47/066; D06F 25/00; D06F 58/22
USPC .............................................. 34/82, 79, 408
See application file for complete search history.

(56) References Cited

U.S. PATENT DOCUMENTS

| 2006/0096335 | A1* | 5/2006 | Park | D06F 25/00 68/20 |
| 2006/0123854 | A1* | 6/2006 | Hong | D06F 25/00 68/19.1 |
| 2009/0064528 | A1* | 3/2009 | Kim | D06F 58/22 34/82 |
| 2010/0154240 | A1* | 6/2010 | Grunert | D06F 58/22 34/82 |
| 2011/0016736 | A1* | 1/2011 | Kim | D06F 58/22 34/82 |
| 2013/0219734 | A1* | 8/2013 | Kim | F26B 21/003 34/82 |
| 2013/0291395 | A1* | 11/2013 | Doh | F26B 21/086 34/468 |
| 2014/0208603 | A1* | 7/2014 | Kim | D06F 58/26 34/79 |
| 2015/0128439 | A1* | 5/2015 | Vir | D06F 58/02 34/85 |
| 2016/0083896 | A1 | 3/2016 | Ryoo et al. | |

FOREIGN PATENT DOCUMENTS

| JP | 2002-113291 | 4/2002 |
| JP | 2002-200395 | 7/2002 |
| JP | 2007-229377 | 9/2007 |
| KR | 10-2006-0065265 | 6/2006 |
| KR | 10-2006-0065266 | 6/2006 |
| KR | 10-2009-0024464 | 3/2009 |
| WO | WO 2014/116001 | 7/2014 |
| WO | WO 2015/068934 | 5/2015 |

OTHER PUBLICATIONS

International Search Report (with English Translation) and Written Opinion dated Nov. 1, 2016 issued in Application No. PCT/KR2016/008576.

* cited by examiner

LAUNDRY TREATING APPARATUS

CROSS-REFERENCE TO RELATED PATENT APPLICATIONS

This application is a U.S. National Stage Application under 35 U.S.C. § 371 of PCT Application No. PCT/KR2016/008576, filed Aug. 3, 2016, which claims priority to Korean Patent Application No. 10-2015-0110194, filed Aug. 4, 2015, whose entire disclosures are hereby incorporated by reference.

TECHNICAL FIELD

The present invention relates to a laundry treating apparatus capable of drying laundry, and more particularly to a laundry treating apparatus having a washable filter provided on an air circulation conduit for drying laundry.

BACKGROUND ART

Generally, a laundry treating apparatus includes a cabinet, an outer tub disposed within the cabinet, and an inner tub rotatably disposed within the outer tub and containing laundry for drying.

A laundry treating apparatus capable of drying laundry supply heated air (hot air) to laundry. Based on a method of handing air that is humidified by contact with laundry, the laundry treating apparatus capable of drying laundry may be classified as an exhaust-type drying system which exhausts the air to the outside, a circulation-type drying system which adjusts temperature and humidity of the air and supplies the air back to laundry, or a hybrid drying system which discharges part of the air and supplies the rest of the air back to laundry.

A laundry treating apparatus having the circulation-type drying system or the hybrid drying system includes a circulation conduit that guides at least part of air in the outer tub to come out from the outer tub and be then supplied back to the outer tub.

However, the air moving along the circulation conduit includes a foreign substance from laundry, such as lint. In particular, if the inner tub rotates during a drying stroke, friction of the laundry occurs and thus foreign substances could increase more. In this case, the foreign substances becomes attached to a temperature and humidity adjustment device provided in the circulation conduit, thereby causing malfunction of the device or dampening operation efficiency, and foreign substances included in air supplied back to the outer tub can be stuck to the laundry.

To solve this problem, an existing technology has suggested a filter disposed within a circulation conduit to remove foreign substances. The existing technology includes a nozzle for spraying water to the filter to automatically remove foreign substances accumulated on the filter.

DISCLOSURE

Technical Problem

In the existing technology, when there is an error in the function of automatically washing the filter or automatic washing is not performed properly, it is necessary to disassemble the apparatus so as to allow a user to manually wash the filter. The first object is to allow a user to easily extract the filter for washing.

In the existing technology, the apparatus needs to be disassembled to check the amount of foreign substances accumulated on the filter with bare eyes. Because some foreign substances possibly remain even after automatic washing of the filter due to a long time of use, it is necessary to see the filter with bare eyes. The second object is to allow a user to easily check foreign substances accumulated on the filter.

In the existing technology, the apparatus needs to be disassembled to replace the filter. The third object is to allow the filter to be easily replaced at a filter replacement timing.

The fourth object is to allow the filter to be easily extracted from the outside, while providing the nozzles and the filter for improvement of the function of automatically washing the filter.

The fifth object is to allow the filter to be easily extracted from the outside, while providing the circulation conduit and the filter so that water sprayed to the filter for automatic washing is guided and drained along the circulation conduit.

The object of the present invention is to solve the aforementioned problems.

Objects of the present invention should not be limited to the above, and other unmentioned objects will be clearly understood by those skilled in the art from the following description.

Technical Solution

In one general aspect, a laundry treating apparatus includes: a cabinet; an outer tub disposed within the cabinet; an inner tub rotatably disposed within the outer tub; a circulation conduit for guiding at least part of air in the outer tub to come out from the outer tub and be then supplied back to the outer tub; a fan disposed in the circulation conduit to move air; a filter net disposed in the circulation conduit to filter foreign substances included in moving air; a filter frame for supporting the filter net; and nozzles for spraying water to remove foreign substances filtered by the filter net.

To achieve the aforementioned objects, the at least part of the filter frame may be an extraction frame that is extractable from an outside of the cabinet.

The nozzles may be disposed toward an air-receiving surface of the filter net. The nozzles may be disposed toward an air-discharging surface of the filter net.

The filter net may be disposed to vertically cross the circulation conduit, and the nozzles may spray water from above the filter net. In this case, the filter net may be obliquely disposed to be tilted downward toward the nozzles, and the filter frame may include a guide surface that guides the water sprayed by the nozzles to run downward.

In a first embodiment, the extraction frame may be extractable from a top surface of the cabinet. In this case, the extraction frame may form an angle in a horizontal direction. In addition, a slit may be formed on a top surface of the circulation conduit to allow the extraction frame to be extracted, and the extraction frame may include a frame sealing portion that seals the slit upon insertion of the extraction frame.

In a second embodiment, the extraction frame may be extractable from a front side surface of the cabinet. In this case, the laundry treating apparatus may further include a guide for guiding the extraction frame to be extracted, and the extraction frame may include a connection part extending along the guide in a forward-backward direction and having one end exposed from the front side surface of the cabinet.

The guide may be formed to curve, and the extraction frame is formed flexible so that the extraction frame curves along the guide. In addition, the guide may have one end connected to the circulation conduit and the other end connected to the front side surface of the cabinet, and an inner passage may be formed from the one end to the other end to allow the extraction frame to be extracted. In this case, the extraction frame may include a frame sealing portion that seals the other end of the inner passage upon insertion of the extraction frame.

In addition, the apparatus may further include comprising a sensor for sensing whether the extraction frame is positioned in a right location in the circulation conduit.

Other features and aspects will be apparent from the following detailed description, the drawings, and the claims.

Advantageous Effects

According to the present invention, it may be possible to easily wash a filter net, check the filter net with bare eyes, and replace a filter.

In addition, as a filter is provided extractable, it is possible to automatically wash the filter and even allow a user to manually wash the filter.

In addition, it is possible to automatically wash the entire area of the filter net with a minimum number of nozzles, and to naturally drain water after washing the filter net.

In addition, as the extraction frame forms an angle, it is possible to reinforce structural stiffness of the extraction frame and allow the filter net to be efficiently disposed in the circulation conduit.

In addition, as the guide is provided, it is possible to prevent the extraction frame from being damaged or interfered with other component when being extracted or inserted.

In addition, as the frame sealing portion is provided, it is possible to keep the inside of the circulation conduit airtight from the outside.

In addition, as the sensor is provided, it is possible to easily check whether the extraction frame is positioned in the right location upon insertion.

Effects of the present invention should not be limited to the aforementioned effects and other unmentioned effects will be clearly understood by those skilled in the art from the claims.

MODE FOR INVENTION

Advantages and features and a method of achieving the same will be more clearly understood from embodiments described below in detail with reference to the accompanying drawings. However, embodiments are not limited to the following embodiments and may be implemented in various different forms. The embodiments are provided merely to complete disclosure and to provide those skilled in the art with the category of the invention. The invention is defined only by the claims. Wherever possible, the same reference numbers will be used throughout the specification to refer to the same or like parts.

A laundry treating apparatus may be a washing machine, a drying machine, etc. Hereinafter, the laundry treating apparatus will be described as being limited to a front-loading washing machine, with reference to FIGS. 1 to 7. The washing machine is a washing and drying machine having the circulation-type drying system or the hybrid drying system.

Figure 1:
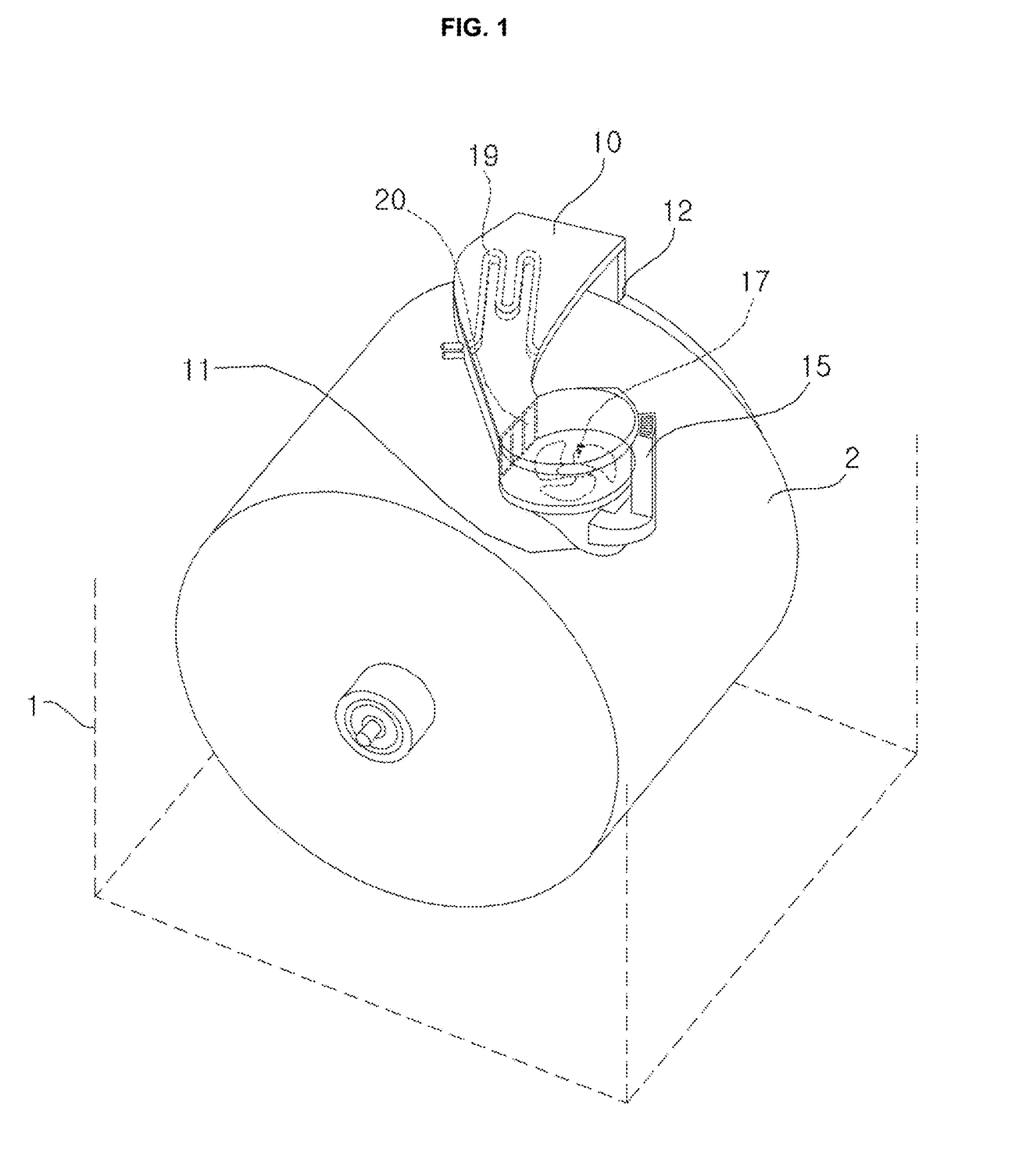
FIG. 1 is a rear side perspective view of a front-loading laundry treating apparatus, from which a cabinet is omitted, according to an embodiment of the present invention.
Figure 2:
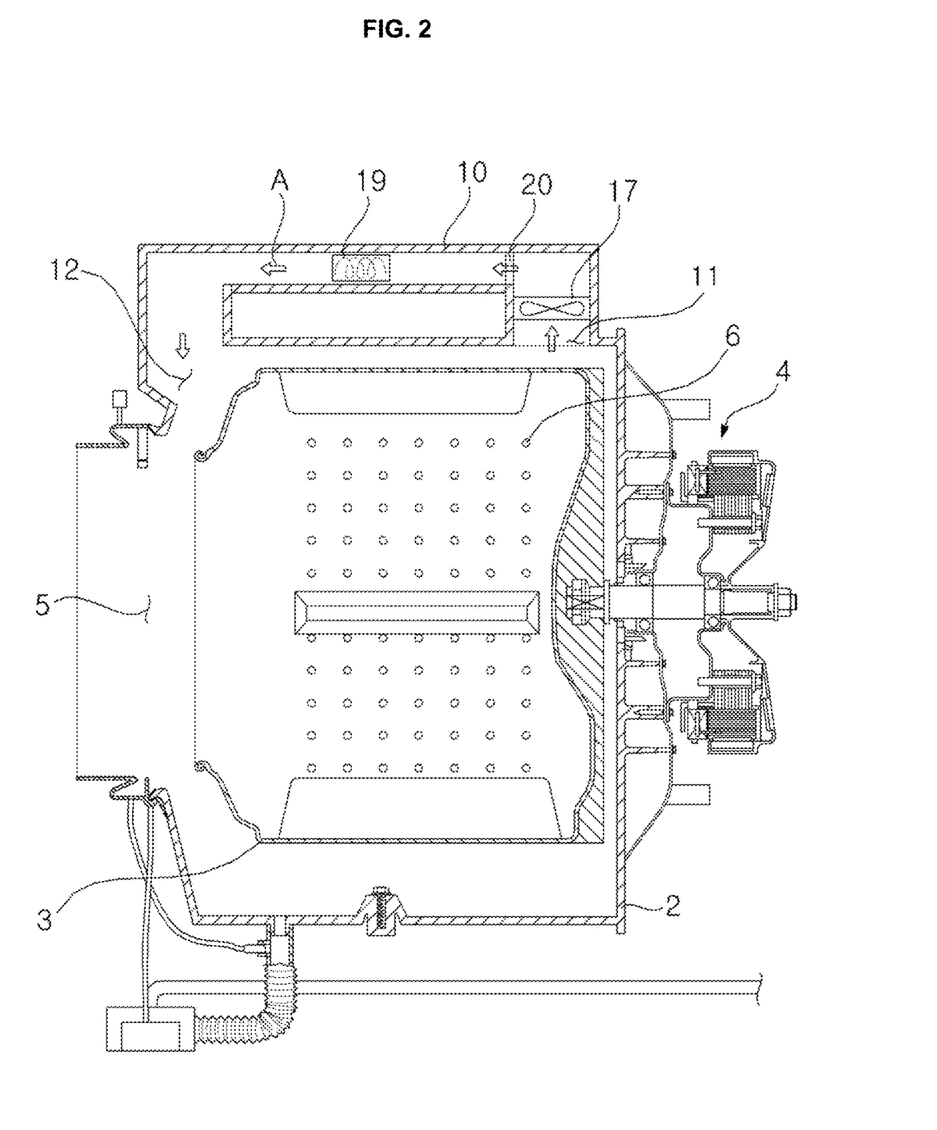
FIG. 2 is a conceptual cross-sectional view of an airflow along a circulation conduit 10 on a longitudinally cut plane of a washing machine of FIG. 1.

FIG. 1 is a rear perspective view of the washing machine from which a cabinet is omitted. FIG. 2 is a conceptual cross-sectional view of an airflow along a circulation conduit 10 on a longitudinally cut plane of the washing machine.

The washing machine includes: a cabinet 1 forming the exterior appearance thereof; an outer tub 2 disposed within the cabinet 1 and capable of containing washing water; and an inner tub 3 rotatably disposed within the outer tub 2 and containing washing water. The washing machine includes: a circulation conduit 10 which guides at least part of water to come out from the outer tub and be then supplied back to the outer tub; and a fan 17 which is disposed along the circulation conduit 10 to move air along the circulation conduit 10. In addition, the washing machine includes a temperature and humidity adjustment device (not shown) which reduces humidity and increases temperature of the air in the circulation conduit. In addition, the washing machine includes: a filter unit 20 which filters a foreign substance from air moving along the circulation conduit 10; and a filter washing unit 30 which supplies water to remove a foreign substance filtered by the filter unit 20.

The outer tub 2 and the inner tub 3 form an induction opening 5 in a forward direction. The inner tub 3 has a shape of a cylindrical structure tilting forward. A driving unit 4 is provided at the rear of the inner tub 3, and the driving unit 4 includes a motor (not shown) connected to a rotation shaft on a rear side surface of the inner tub 3. The motor rotates the inner tub 3. A plurality of inner tub through-holes 6 is formed on a circumferential surface of the cylinder structure of the inner tub 3. Through the inner tub through-holes 6, washing water or air inside the inner tub 3 flows into the outer tub 2 or leaks from the outer tub 2.

During a drying stroke of the circulation-type drying system, the circulation conduit 10 guides the entire air to come out from the outer tub 2 and be then supplied back to the outer tub 2. That is, during the drying stroke of the circulation-type drying system, air inside the outer tub 2 is not discharged.

During a drying stroke of the hybrid drying system, the circulation conduit 10 guides part of air in the outer tub 2 to come out from the outer tub 2 and be then supplied back to the outer tub 2. That is, during the drying stroke of the hybrid drying system, part of air in the outer tub 2 is discharged. In this case, the washing machine includes: an air discharge passage (not shown) which guides part of air in the outer tub 2 to be discharged; and an intake passage 15 which guide air to flow into the outer tub 2 from the outside. In this embodiment, the intake passage 15 is connected directly to the circulation conduit 10, and the fan 17 is disposed at a downstream point of a portion where the intake passage 15 and the circulation conduit 10 are connected.

The circulation conduit 10 is provided with an upstream end 11 connected to the rear side of the outer tub 2 and a downstream end 12 connected to the front side of the outer tub 2. The downstream end 12 of the circulation conduit 10 is connected to the upper side of the induction opening 5 of the outer tub 2.

A direction of an airflow indicated by an arrow A in FIG. 2 is as below. Once the fan 17 operates, air in the outer tub 2 flows into the upstream end 11 of the circulation conduit. The air flown into the circulation conduit 10 moves to the downstream end 12 of the circulation conduit 10 by passing through the fan 17, the filter unit 20, and the temperature and humidity adjustment device 19. The air moved into the downstream end 12 of the circulation conduit flows into the outer tub 2. The air flown into the outer tub 2 dries laundry by flowing into the center of the front side and then moving to the rear side within the inner tub 3. The air flown into the inner tub 3 and dried the laundry is discharged outside the inner tub 2, moves to the upstream end 11 of the circulation conduit, and, in turn, flows back into the circulation conduit 10.

The upstream end 11 of the circulation conduit disposed at the rear side of the outer tub 2 is connected to the outer tub 2 between a lateral side surface and a top surface of the outer tub 2. The downstream end 12 of the circulation conduit disposed at the front side is connected to the outer tub 2 on the top surface of the outer tub 2. The circulation conduit 10 extends upward from the upstream end 11, is bent forward below the top surface of the cabinet 1, and then extends to the downstream end 12. Along a passage formed by the circulation conduit 10, air flows into the circulation conduit 10 through the upstream end 11 to move upward, curves forward to move forward, and then flows into the outer tub 2 from the downstream end 12 of the circulation conduit.

The sequence of arrangement of the fan 17 and the temperature humidity adjustment device 19 along the circulation conduit 10 may vary depending on embodiments, but, in this embodiment, the fan 17 is disposed in a more upstream side of the circulation conduit 10 than the temperature and humidity adjustment device 19.

The temperature and humidity adjustment device is classified as a cooling device (not shown) for removing humidity from air moving along the circulation conduit or as a heater 19 for increasing temperature of the air. The cooling device and the heater 19 may be implemented as various means which are able to be adapted by those skilled in the art, such as a device using an evaporator and a condenser or a device using a thermo element.

The filter unit 20 includes a filter net 22 disposed along the circulation conduit 10 to filter a foreign substance included in moving air, and a filter frame 24 supporting the filter net 22. The filter net 22 forms a mesh-structured surface. The filter frame 24 provides a plurality of boundaries supporting a plurality of filter nets 22.

Figure 4:
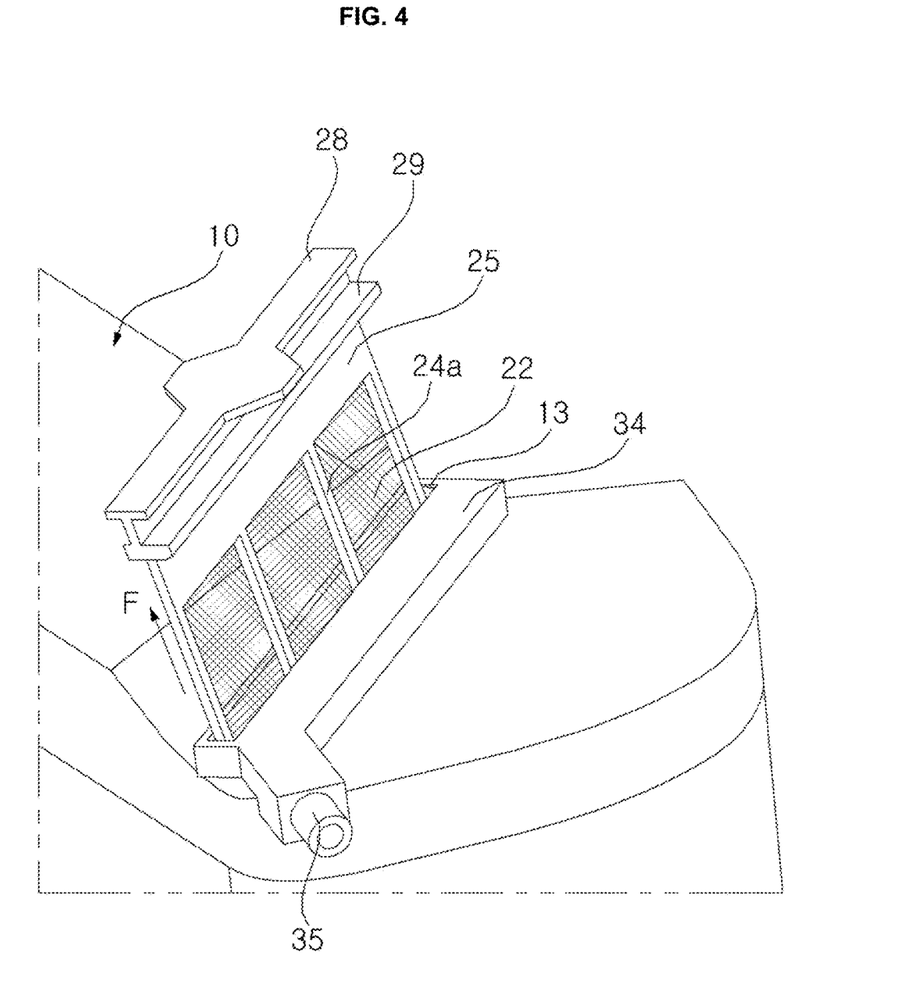
FIG. 4 is a perspective view of the filter frame 24 of FIG. 3 being extracted from the circulation conduit 10.
Figure 5:
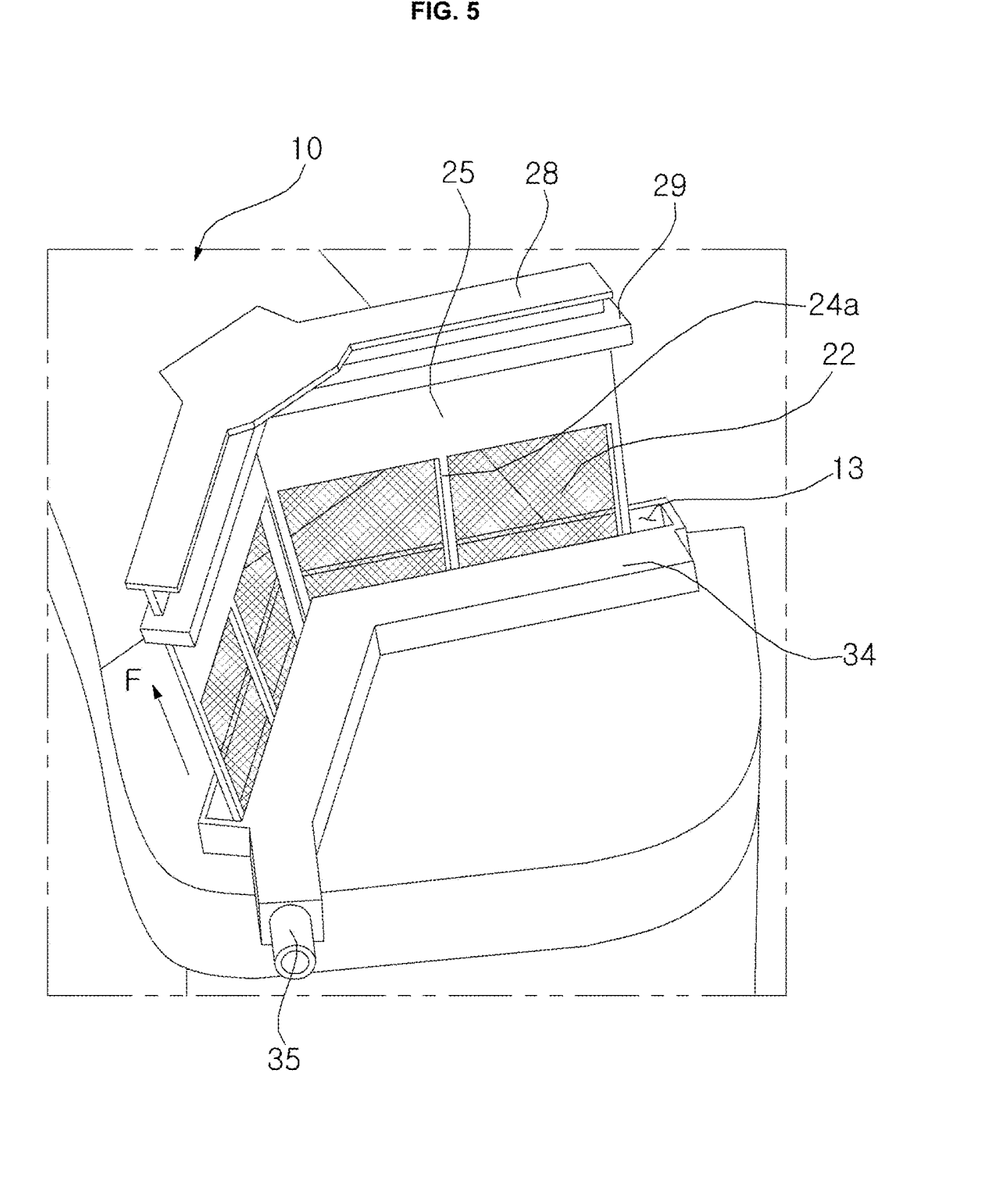
FIG. 5 is a perspective view of the filter frame 24, being extracted from the circulation conduit 10, according to a variation of the first embodiment.
Figure 6:
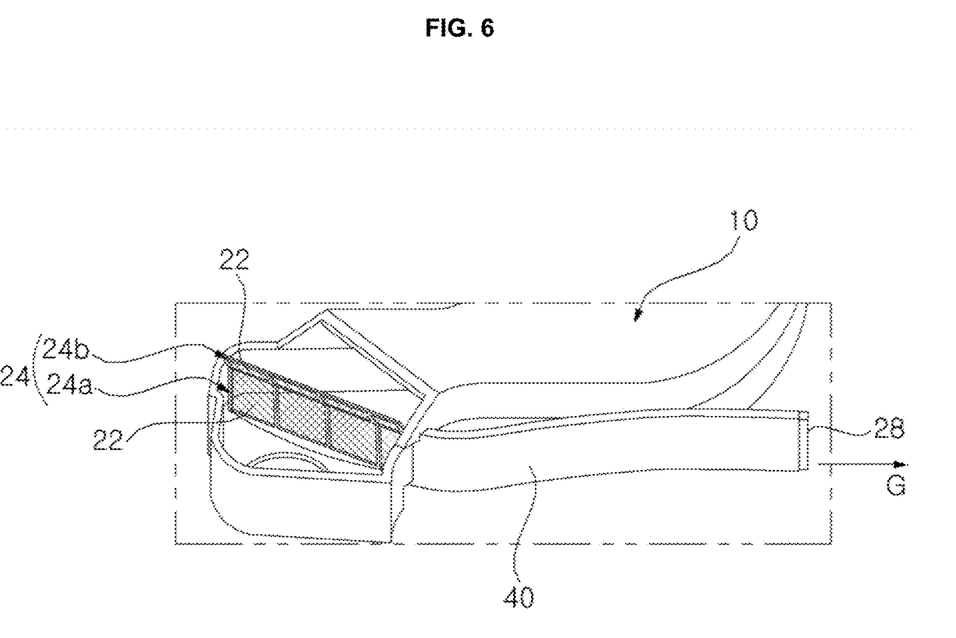
FIG. 6 is a perspective view a partially open circulation conduit 10, the filter frame 24, and a guide 40 according to a second embodiment.

At least part of the filter frame 24 is an extraction frame 24*a* that is extractable from the outside of the cabinet 1. As shown in FIGS. 4 and 5, in the case where the entire filter frame 24 is extractable, the entire filter frame 24 is defined as the extraction frame 24*a*. On the other hand, as shown in FIG. 6, in the case where only part of the filter frame 24 is extractable, only the extractable part of the filter frame 24 is defined as the extraction frame 24*a*, whereas the rest part of the filter frame 24, fixed not to be extractable, is defined as a fixed frame 24*b*.

In the case where the filter net 22 supported by the extraction frame 24*a* is disposed to cross only part of a cross-section of the circulation conduit 10, the filter net 22 supported by the fixed frame 24*b* may be additionally disposed to cross the rest part of the cross-section of the circulation conduit 10, so that the filter net 22 is disposed to cross the entire cross-section of the circulation conduit 10. The extraction frame 24*a* and the fixed frame 24*b* may be disposed to form an angle relative to each other.

The washing machine may include a sensor (not shown) for sensing whether the extraction frame 24*a* is positioned at the right location in the circulation conduit 10. In the case where the extraction frame 24*a* is extracted from the cabinet 1 and then inserted thereinto, the sensor senses whether the extraction frame 24 is fully inserted to make the filter net 22 positioned in the right location. In doing so, filtering performance of the filter net 22 and airtightness of the circulation conduit 10 may be secured.

The washing machine may include a display unit (not shown) for outputting sound or visual information to inform a user of a wrong position of the extraction frame 24*a* when the extraction frame 24*a* fails to be inserted in the right location.

Figure 3:
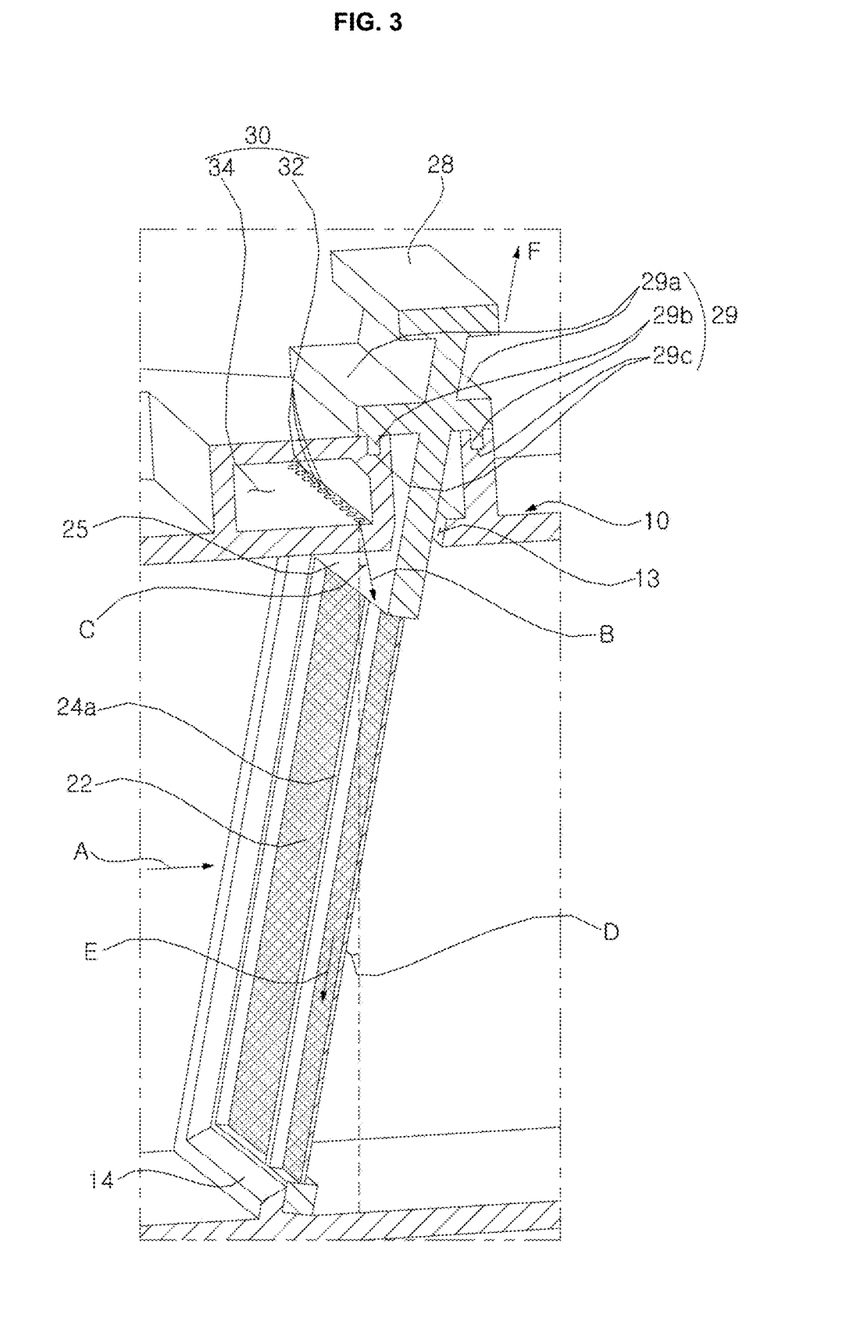
FIG. 3 is a vertical cross-sectional view of a circulation conduit 10 and a filter frame 24 according to a first embodiment.

The filter washing unit 30 includes: a plurality of nozzles 32 for spraying water to remove a foreign substance filtered by the filter net 22; and a water supply passage 34 for guiding water to the plurality of nozzles 32. The plurality of nozzles 32 may be spaced apart from one another along the inner surface of the circulation conduit 10. The plurality of nozzles 32 may be aligned in a straight line while being spaced apart from one another. With reference to FIG. 3, a portion of the water supply passage 23 being directly connected to the plurality of nozzles 32 may be coupled to the circulation conduit 10. Referring to FIGS. 4 and 5, the portion of the water supply passage 32 being connected directly to the plurality of nozzles 32 (which is indicated as 34 in FIG. 3) and the rest portion of the water supply passage 34 may be connected to each other via a water supply fastening part 35. The water supply fastening part 35 protrudes from one of the two separated parts of the water supply passage 34 to be inserted to the other thereof. In this embodiment, an insert 35, which is the water supply fastening part 35, is formed at the portion of the water supply passage 34 being directly connected to the plurality of nozzles 32 (see FIGS. 4 and 5).

As air passes through the filter net 22 in the circulation conduit 10, foreign substances are filtered by an air-receiving surface of the filter net 22 and thus accumulated thereon.

In one embodiment, the nozzles 32 may be disposed toward the air-receiving surface of the filter net 22 to spray water toward the air-receiving surface. In this case, the sprayed water applies an impact directly to the foreign substance accumulated on the filter net 22, thereby removing the foreign substances from the filter net 22.

In another embodiment, the nozzle 32 is disposed toward an air-discharging surface of the filter net 22 to spray water toward the air-discharging surface of the filter net 22. In this case, the sprayed water may push accumulated foreign substances in a direction from which the foreign substances can be removed from the filter net 22.

In this embodiment, the filter net 22 is disposed to vertically cross the circulation conduit 10, and the nozzles 32 sprays water toward the upper part of the filter net 22 from above the filter net 22. The sprayed water runs down the filter net 22 by gravity, thereby removing foreign substances accumulated on the filter net 22. That is, it is possible to wash the entire area of the filter net 22 by letting water run down from up above, without directly spraying water to the entire area of the filter net 22.

The filter net 22 may be disposed at a downstream side of a portion at which the circulation conduit 10 is bent forward from the upward direction (that is, a point between i) a point "at which the circulation conduit 10 is bent forward from the upward direction" and ii) "the downstream end 12 of the circulation conduit 10") to vertically cross the circulation conduit 10. The fan 17 may be disposed at an upstream side of a portion at which the circulation conduit 10 is bent forward from the upward direction (that is, a portion between i) "a point at which the circulation conduit 10 is bent forward from the upward direction" and ii) "the upstream end 11 of the circulation conduit 10). The filter net 22 may be disposed close to a downstream side of the fan 17. The bottom surface inside the circulation conduit 10, which is disposed at a lower side of the filter net 22, may be formed concave. As the bottom surface inside the circulation conduit 10, which is disposed at a lower side of the filter net 22, is formed concave, the bottom surface may allow water to be collected and guide the water to flow in a predetermined direction. The bottom surface inside the circulation conduit 10, which is disposed at a lower side of the filter net 22, may be formed to be tilted in an upstream direction (a direction toward the upstream end 11 of the circulation conduit 10), and, in this case, water running down the filter net 22 drops to the bottom surface inside the circulation conduit and then flows in the upstream direction. The water flowing in the upstream direction moves downward along the circulation conduit within a section where the circulation conduit 10 is formed upward, and then the water flows into the outer tub 2 through the upstream end 11. The water flown into the outer tub 2 moves downward to be discharged to the outside through a drain unit (not shown).

The filter net 22 may be disposed to be tilted downward toward the nozzles 32, while vertically crossing the circulation conduit 10. That is, when it comes to definition of a direction in which the nozzles 32 are disposed and a direction in which the nozzles are not disposed with reference to a location of the filter net 22, the filter net 22 may be disposed to be tilted while protruding in a downward direction in which the nozzles 32 are disposed. Accordingly, water sprayed from the nozzles 32 is caused to run down the filter net 22 at an appropriate speed, thereby helping to wash the filter net 22. With reference to FIG. 3, a normal downward direction and a direction extending downward of the filter net 22 may form an angle D, and, in this case, water runs down a slope of the filter net 22 in a direction indicated by an arrow E.

The filter frame 24 may include a guide surface 25 for guiding water sprayed from the nozzles 32 to run downward. The guide surface 25 is disposed in the upper side of the filter frame 24. The guide surface 25 may be disposed in the upper side of the extraction frame 24a, and, in the case where the fixed frame 24b is disposed above the extraction frame 24a, the guide surface 25 may be disposed in the fixed frame 24b. The lower part of the guide surface 25 supports the upper part of the filter net 22. The guide surface 25 is disposed on a plane vertically crossing the circulation conduit 10, and on a plane substantially parallel or substantially identical to a plane on which the filter net 22 is formed.

In the case where water is directly sprayed to the filter net 22, a considerable amount of water flows into the mesh structure of the filter net 22, thereby penetrating the filter net 22 without running down the filter net 22. On the other hand, in the case where water is sprayed to the guide surface 25, the sprayed water is unable to penetrate the guide surface 25 but runs down the guide surface 25 and then flows along the filter net 22 positioned below the guide surface 25. In addition, as the sprayed water spreads out across the guide surface 25 and runs down, it is possible to meticulously wash of the filter net 22 with even a small number of nozzles.

The nozzles 32 may obliquely spray water toward the guide surface 25. With reference to FIG. 3, as an angle C formed by a normal downward direction and a direction B in which water is sprayed from the nozzles 32 toward the guide surface 25 increases, water may be spread onto the guide surface 25 in a more wide range: however, as the angle C decreases, sprayed water may run down the guide surface 25 and the filter net 22 quickly.

In this embodiment, the angle C of water to be sprayed is approximately between 10 degrees and 20 degrees, and the angle D between the filter net 22 and the guide surface 25 is approximately between 10 degrees and 20 degrees. Within these numerical range, a degree of spreading of sprayed water and a speed of water to run downward are adjusted properly, and therefore, the filter net 22 may be washed evenly and cleanly.

According to a direction in which the extraction frame 24a is extracted, first and second embodiments are described as below. In the first embodiment, the extraction frame 24a is extractable from the top surface of the cabinet 1. In the second embodiment, the extraction frame 24a is extractable from the front side surface of the cabinet 1.

Hereinafter, the first embodiment will be described with reference to FIGS. 3 to 5. FIG. 3 is a vertical cross-sectional view of the circulation conduit 10 and the extraction frame 24a. FIG. 4 is a perspective view of the extraction frame 24a being extracted from the circulation conduit 10. FIG. 5 is a perspective view of the extraction frame 24a, being extracted from the circulation conduit 10, according to variation of the first embodiment.

The extraction frame 24a is disposed close to a bottom layer of the top surface of the cabinet 1. In the case where the extraction frame 24a is obliquely tilted, the extraction frame 24a is extracted in an upward direction F of the tilted angle.

In one example, the extraction frame 24a may be formed as a single plane type, as shown in FIG. 4.

In another example, the extraction frame 24a may form an angle in a horizontal direction, as shown in FIG. 5. That is, with reference to FIG. 5, the extraction frame 24a may provide a frame so that the filter net 22 is disposed on at least two virtual planes forming an angle relative to each other. More particularly, the extraction frame 24a may be formed to have a shape that is bent on a cross section of a virtual plane vertical to a direction in which the extraction frame 24 is extracted. Accordingly, a slit 13 is formed to have a shape that is bent according to the bent shape of the extraction frame 24a. In the another example, horizontal stiffness of the extraction frame 24a may be reinforced and the filter net 22 having an area larger than the above example may be disposed in the circulation conduit 10, thereby increasing a collectable amount of foreign substances.

With reference to FIG. 3, the slit 13 for allowing the extraction frame 24a to be extracted is formed on the top surface of the circulation conduit 10. A sealing portion is formed in a space between a lateral side surface and a bottom surface of the circulation conduit so as to keep the space airtight upon insertion of the extraction frame 24a. The sealing portion 14 is formed to extend along a portion where the extraction frame 24a contacts an inner side surface of the circulation conduit 10. The sealing portion 14 may be formed to protrude from the inner side surface of the circulation conduit 10. The sealing portion 14 is formed to protrude from the circulation conduit 10 along the both side ends and the lower side end of the extraction frame 24a. The sealing portion 14 plays a role of guiding an extraction track of the extraction frame 24a.

The extraction frame 24a includes a frame sealing portion 29 for airtightly sealing the slit 13 upon insertion of the extraction frame 24a. The frame sealing portion 29 includes a pair of sealing ribs 20a respectively protruding toward the front and rear surfaces of the extraction frames 24a. The pair of sealing ribs 28a extends along the slit 13. The pair of sealing ribs 29a covers the slit 13 from above upon insertion of the extraction frame 24a. In a portion where an edge of the top surface of the slit 13 and the bottom surface of the pair of sealing ribs 29a, additional ribs 29b extending along a direction of the slit and protruding toward one between the edge of the top surface of the slit 13 and the bottom surface of the pair of sealing ribs 29a is formed in the other one between the edge of the top surface of the slit 13 and the bottom surface of the pair of sealing ribs 29a. Upon insertion of the extraction frame 24a, the additional ribs 29b and the grooves 29c are engaged with one another to airtightly seal the slit 13 of the circulation conduit 10.

An exposed portion 28 is formed at the upper part of the extraction frame 24a, so that the exposed portion 28 is exposed from the top surface of the cabinet 1 even upon insertion of the extraction frame 24a. An opening (not shown) is formed on the top surface of the cabinet 1 to allow the extraction frame 24a to be extracted, and the exposed portion 28 covers the opening of the cabinet 1. The exposed portion 28 may include a handle by which a user is able to push or pull the extraction frame 24a.

Figure 7:
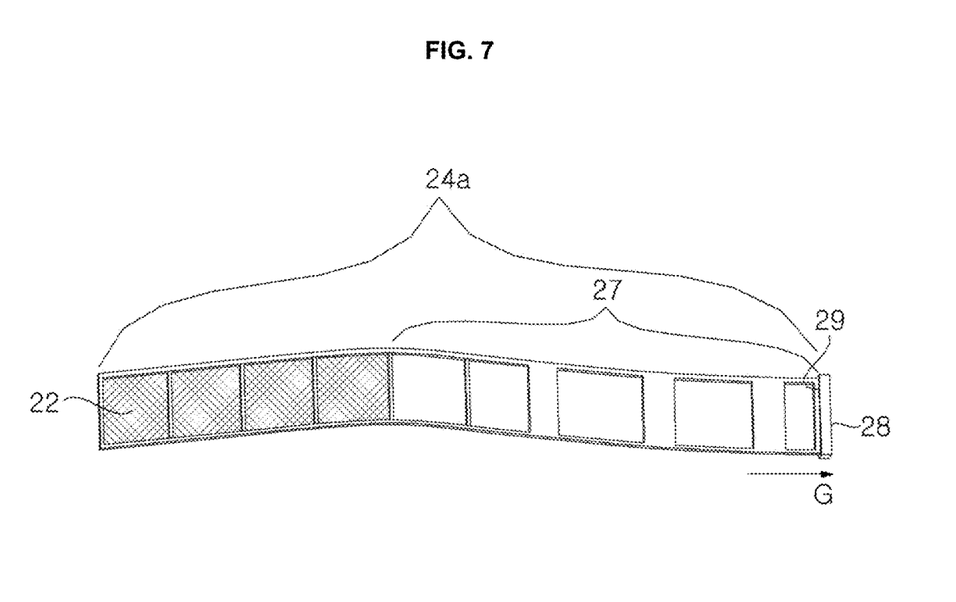
FIG. 7 is a perspective view illustrating an extraction frame 24a of FIG. 6, which is being separated.

Hereinafter, a second embodiment will be described with reference to FIGS. 6 and 7. Description about the first embodiment can be applied by those skilled in the art to the second embodiment. The second embodiment will be described mainly about difference from the first embodiment.

FIG. 6 is a perspective view of the circulation conduit 10, the filter frame 24, and the guide 40 according to the second embodiment. For the convenience of explanation, the circulation conduit 10 is depicted in FIG. 6 as being partially open, but the circuit conduit 10 is formed closed when the present invention is actually implemented. FIG. 7 is a perspective view of the extraction frame 24a of FIG. 6, which is being separated.

The filter net 22 may be disposed close to the rear side surface than the front side surface of the cabinet 1. To extract the filter net 22 from the front side surface of the cabinet 1, a connection means for connecting the filter net 22 and the front side surface of the cabinet 1 and a guide means for guiding the connection means are needed.

The washing machine includes the guide 40 for guiding the extraction frame 24a to be extracted. The extraction frame 24a includes a connection part 27 that extends in the front-rear direction along the guide 30 so that one end of the connection part 27 is exposed from the front side surface of the cabinet 1. Such one end of the connection part 27 forms the exposed portion 28. In doing so, although the filter net 22 is disposed at a considerable distance from the front side surface of the cabinet 1, the extraction frame 24a is able to be pulled by a user in a direction G from the front side surface of the cabinet 1 or to be inserted in the right location. The other end of the connection part 27 is connected to a frame in the extraction frame 24a, in which the filter net 22 is positioned. At a time when the extraction frame 24a is inserted in the right location, one end of the connection part 27 is disposed at the front side surface of the cabinet 1 and the other end is disposed inside the circulation conduit 10.

The filter net 22 is disposed to vertically cross the circulation conduit 10. In addition, the filter net 22 may be disposed to cross the circulation conduit 10 in a direction vertical to the front side surface of the cabinet 1: however, in this embodiment, the filter net 22 is disposed obliquely, not vertically, with respect to the front side surface of the cabinet 1, as shown in FIG. 6. In this embodiment, the guide 40 guides a curved path so that the extraction frame 24a may be extracted in a direction vertical to the front side surface of the cabinet 1. That is, the guide is formed to curve.

In some implementations, even in the case where a periphery component positioned between the filter net 22 and the front side surface of the cabinet 1 interferes with extraction of the extraction frame 24a, the guide 40 may curve to avoid the periphery component.

In the case where the guide 40 curves, the extraction frame 24a is formed flexible so that the extraction frame 24a curves along the guide 40. As the extraction frame 24a is a plate which defines thickness of the left-right direction, the extraction frame 24a has a structure advantageous in bending in the left-right direction. In another example, in the case where the extraction frame 24a is disposed to substantially horizontally cross the circulation conduit 10, the extraction frame 24a is a plate, which defines thickness of the upward-downward direction, and thus advantageous in bending vertically. In this embodiment, description is limited to the extraction frame 24 defining thickness of the left-right direction.

The guide 40 surrounds the connection part 27 on a cross section of the connection part 27. Since the extraction frame 24a has weak flexural rigidity in the left-right direction, buckling of the extraction frame 24a could occur in the left-right direction upon insertion of the draw frame 24a, but the guide 40 surrounding the extraction frame 24a may prevent such buckling.

One end of the guide 40 is airtightly connected to the circulation conduit 10, and the other end thereof is connected to the front side surface of the cabinet 1. From the one end to the other end of the guide 40, an inner passage is airtightly formed to allow the extraction frame 24a to be extracted. The extraction frame 24a includes a frame sealing portion 29 that seals the other end of the inner passage (which is a portion connected to the front side surface of the cabinet) upon insertion of the extraction frame 24a.

The frame sealing portion 29 may have the sealing rib 29a that is provided in the form applicable to the second embodiment. On a surface where the other end surface of the guide 40 and the frame sealing portion 29, the additional ribs 29b and the grooves 29c may be provided in the form applicable to the second embodiment.

The frame sealing portion 29 may include a pair of sealing ribs respectively protruding in directions toward the front side surface and the rear side surface of the extraction frame 24a. The pair of sealing ribs extends along the other end of the inner passage. Upon insertion of the extraction frame 24a, the pair of sealing ribs covers the other end of the inner passage from the front. In a contact portion between the other end surface of the guide 40 and the rear side surface of the pair of the sealing ribs, additional ribs protruding in a direction toward one of the other end surface of the guide 40 and the rear side surface of the pair of the sealing ribs and extending along a vertical direction may be formed in one of the other end surface and the rear side surface of the pair of the sealing ribs. Grooves recessed to be engaged with the additional ribs may be formed in the other one of the other end surface and the rear side surface of the pair of the sealing ribs. Upon insertion of the extraction frame 24a, the additional ribs and the grooves are engaged with each other to seal the other end of the inner passage airtightly.

An exposed portion 28 is formed at the front end of the extraction frame 24a, so that the exposed portion 28 is exposed from the front side surface of the cabinet 1 even upon insertion of the extraction frame 24a. An opening (not shown) is formed at the front side surface of the cabinet 1 to allow the extraction frame 24a to be extracted, and the exposed portion 28 covers the opening of the cabinet 1. The exposed portion 28 may include a handle by which a user is able to push or pull the extraction frame 24a.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A laundry treating apparatus comprising:
   a cabinet;
   an outer tub disposed within the cabinet;
   an inner tub rotatably disposed within the outer tub;
   a circulation conduit for guiding at least part of air in the outer tub to come out from the outer tub and be then supplied back to the outer tub;
   a fan disposed in the circulation conduit to move air;
   a filter net disposed in the circulation conduit to filter foreign substances included in moving air;
   a filter frame for supporting the filter net; and
   nozzles for spraying water to remove foreign substances filtered by the filter net,
   wherein the filter frame comprises an extraction frame that extends in a horizontal direction and that is extractable from an outside of the cabinet, and a fixed frame that is fixed in the circulation conduit and is provided above the extraction frame.

2. The laundry treating apparatus of claim 1, wherein the nozzles are disposed toward an air-receiving surface of the filter net.

3. The laundry treating apparatus of claim 1, wherein the nozzles are disposed toward an air-discharging surface of the filter net.

4. The laundry treating apparatus of claim 1,
   wherein the filter net is provided across a cross-sectional area of the conduit, and wherein the nozzles spray water from above the filter net.

5. The laundry treating apparatus of claim 4, wherein the filter net is obliquely disposed to be tilted downward away from the nozzles.

6. The laundry treating apparatus of claim 4, wherein the filter frame comprises a guide surface that guides the water sprayed by the nozzles to run downward.

7. The laundry treating apparatus of claim 6, wherein the nozzles spray water obliquely toward the guide surface.

8. The laundry treating apparatus of claim 1,
   wherein a slit is formed on a side surface of the circulation conduit to allow the extraction frame to be extracted, and
   wherein the extraction frame comprises a frame sealing portion that seals the slit upon insertion of the extraction frame.

9. The laundry treating apparatus of claim 8, wherein the extraction frame is extractable from a front side surface of the cabinet.

10. The laundry treating apparatus of claim 9, further comprising: a guide for guiding the extraction frame to be extracted,
    wherein the extraction frame comprises a connection part extending along the guide in a forward-backward direction and having one end exposed from the front side surface of the cabinet.

11. The laundry treating apparatus of claim 10,
    wherein the guide is formed to curve, and
    wherein the extraction frame is formed flexible so that the extraction frame curves along the guide.

12. The laundry treating apparatus of claim 10, wherein the guide surrounds the connection part.

13. The laundry treating apparatus of claim 10, wherein the guide has one end connected to the circulation conduit and the other end connected to the front side surface of the cabinet, and an inner passage is formed from the one end to the other end to allow the extraction frame to be extracted.

14. The laundry treating apparatus of claim 13, wherein the extraction frame comprises a frame sealing portion that seals the other end of the inner passage upon insertion of the extraction frame.

15. The laundry treating apparatus of claim 9,
    wherein the outer tub has an opening formed in a front side surface thereof for introduction of laundry,
    wherein the circulation conduit is formed so that air flows into the circulation conduit from a rear side of the outer tub to move upward, curves forward, and be then discharged toward a front side of the outer tub, and
    wherein the filter net is disposed at a downstream side of a portion, at which the circulation conduit is bent forward from an upward direction, across a cross-section of the circulation conduit.

16. The laundry treating apparatus of claim 1, further comprising a sensor for sensing whether the extraction frame is positioned in a right location in the circulation conduit.

17. The laundry treating apparatus of claim 1, wherein the filter net comprises a first filter net and a second filter net, and wherein the extraction frame includes the first filter net and the fixed frame includes the second filter net.

* * * * *

UNITED STATES PATENT AND TRADEMARK OFFICE
CERTIFICATE OF CORRECTION

PATENT NO. : 10,661,214 B2  
APPLICATION NO. : 15/750468  
DATED : May 26, 2020  
INVENTOR(S) : Hyojun Kim and Sokgie Hong

Page 1 of 1

It is certified that error appears in the above-identified patent and that said Letters Patent is hereby corrected as shown below:

On the Title Page

Item (30), Foreign Application Priority Data should read:  
Aug. 4, 2015  (KR) .....................10-2015-0110194

Signed and Sealed this  
Eleventh Day of August, 2020

Andrei Iancu  
*Director of the United States Patent and Trademark Office*